United States Patent
Agampodi et al.

(10) Patent No.: US 9,122,709 B2
(45) Date of Patent: Sep. 1, 2015

(54) MANAGEMENT OF MEDIA FILES

(75) Inventors: Thusha Agampodi, Ottawa (CA); Christopher Adam Manley, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 205 days.

(21) Appl. No.: 12/823,673

(22) Filed: Jun. 25, 2010

(65) Prior Publication Data

US 2011/0320402 A1    Dec. 29, 2011

(51) Int. Cl.
*G06F 17/30*    (2006.01)
(52) U.S. Cl.
CPC ........ *G06F 17/3028* (2013.01); *G06F 17/3074* (2013.01); *G06F 17/30781* (2013.01)
(58) Field of Classification Search
None
See application file for complete search history.

(56) References Cited

U.S. PATENT DOCUMENTS

| | | | | |
|---|---|---|---|---|
| 7,920,856 | B2* | 4/2011 | Lin et al. | 455/418 |
| 7,979,392 | B2* | 7/2011 | Oh et al. | 707/621 |
| 2007/0156779 | A1 | 7/2007 | Ho et al. | |
| 2007/0186275 | A1* | 8/2007 | Shahbazi | 726/2 |
| 2007/0282848 | A1* | 12/2007 | Kiilerich et al. | 707/10 |
| 2008/0313302 | A1* | 12/2008 | Heyworth et al. | 709/217 |
| 2009/0125227 | A1* | 5/2009 | Wistrand | 701/200 |
| 2009/0282050 | A1* | 11/2009 | Thomas et al. | 707/10 |
| 2009/0282057 | A1* | 11/2009 | Thomas | 707/100 |
| 2009/0282077 | A1* | 11/2009 | Thomas | 707/104.1 |
| 2009/0282078 | A1* | 11/2009 | Thomas et al. | 707/104.1 |
| 2009/0282088 | A1* | 11/2009 | Thomas et al. | 707/201 |

FOREIGN PATENT DOCUMENTS

| | | |
|---|---|---|
| CA | 2744464 | 12/2011 |
| EP | 2400402 A1 | 12/2011 |
| WO | WO-2006/072854 A1 | 7/2006 |

OTHER PUBLICATIONS

MediaMonkey 3 Manual, Ventis Media Inc., 2009.*
webOS Nation webpage http://forums.webosnation.com/webos-synergy-synchronization/231036-ultimate-guide-syncing-music-playlists-using-mediamonkey.html, forum posting from Feb. 17, 2010.*
"European Application Serial No. 10167425.7, European Search Report mailed Nov. 2, 2010", 6 pgs.

* cited by examiner

*Primary Examiner* — Jay Morrison
(74) *Attorney, Agent, or Firm* — Jon Gibbons; Fleit Gibbons Gutman Bongini & Bianco P.L.

(57) ABSTRACT

Apparatus, systems, and methods provide a mechanism to enhance the management of mobile devices for users of the mobile devices. Various embodiments include apparatus and methods to manage media content for a mobile device with respect identification, in a management system, of the media content of the mobile device. Additional apparatus, systems, and methods are disclosed.

25 Claims, 4 Drawing Sheets

MANAGEMENT OF MEDIA FILES

BACKGROUND

Individuals in modern society have access to information and media far beyond what they create individually. Most of this media comes from information sources that are not under the individual's direct control. These information sources typically add their own information which remains part of the media itself. Improvements to the management of this media enhance one's ability to interact with others, to respond to changing needs, and to avail oneself of enjoyment from processing various media based information.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

In various embodiments, systems, apparatus, and methods provide a mechanism to enhance the management of mobile devices for users of the mobile devices. Various embodiments include apparatus and methods to manage media content for a mobile device with respect identification of the media content in the mobile device under control of a management system. The mobile device may be a mobile wireless communications device for which media content, such as songs operable for play on the mobile wireless communications device, can be managed.

Figure 1:
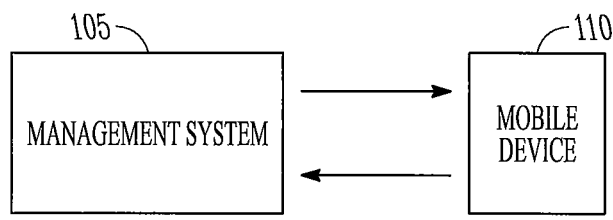
FIG. 1 shows an example embodiment of a system and a mobile device arranged to manage media content in the mobile device, according to various embodiments.

FIG. 1 shows an example embodiment of a management system 105 and a mobile device 110 arranged to manage media content in mobile device 110. Management system 105 and methods of operating management system 105 can include managing media content for mobile device 110 with respect to identification, in management system 105, of the media content residing on mobile device 110. Media is a form of general communication, information, or entertainment, which is typically intended to be used by a large audience, thought not limited to a large audience. Various media, or media types, may include, but are not limited to, music, videos, movies, music videos, television shows, interactive applications, audiobooks such as electronic books (e-books), podcasts, games, personal presentations, and other presentations. Each individual form of a media type may be referred to as media content or media art. Media content may include content in any media format. Some examples of media content may include, but are not limited to, audio files, video files, image files, podcast files, e-book files, multimedia files, files/folders that include one or more media files selected individually from a collection of different media files generated by a commercial entity, and files/folders that include one or more media files generated by a non-commercial entity. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, and wmf. A media file associated with an extension, which indicates the file format, can be operated on by an associated playing device (player) in mobile device 110 to provide an output that can be presented as communication, information, entertainment, other presentations, or combinations thereof for the user of mobile device 110.

Systems and methods for managing media content may be configured such that the management may be conducted with limited user interaction, and, in various embodiments, the system may perform essentially autonomously. Systems that manage media content may include various apparatus, such as computer systems or other systems, having hardware, software, and/or hardware and software to manage media content. In various embodiments, a personal computer (PC) can be used to manage media content and associated media files. A personal computer, as is generally known, herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that can communicate with an entity over a channel established by the entities in a wireless network. The wireless server may operate with connections to such wireless networks or a wired network operatively coupling the wireless server to the wireless network. Other devices, such as mobile wireless communications devices, can be implemented to manage media content.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical (electronic) quantities within the computer system's registers and memories into other data similarly represented as physical quantities within the computer system memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, management system 105 can be realized as a PC that manages media content in relationship to one or more mobile devices 110. Each mobile device 110 can play media files and can interact with the PC with respect to the management of media content on the respective mobile device 110. In various embodiments, the mobile devices include instrumentalities similar to those of the PC to manage the media content on the mobile device and to engage with a PC in interactive management of media content on the mobile device and/or on other mobile devices in which the media content may be shared. Other apparatus configured with hardware, software, and/or hardware and software to function in a similar manner as the PC to manage media content may be used in conjunction with the mobile devices 110.

In various embodiments, mobile device 110 can be realized as a mobile media device such as a portable music player, a portable video player, a portable e-book reader, or other type of media player. Mobile device 110 can be a mobile wireless communications device. The mobile wireless communications devices may include, but are not limited to, mobile telephones, portable computers, PDAs, and other devices that may be conveniently carried by a user and provide wireless communication. Mobile telephones include wireless communications devices that have generally been referred to as cell phones. Mobile telephones may include a wide range of communication devices from portable phones with limited functionality beyond voice communication to portable phones capable of providing functionality of a personal computer, which portable phones may be referred to as smart phones.

In an embodiment, a system organizes information associated with media content from multiple media sources into a single unified library file. The information may be organized as indexed information. Managing media content is not limited to a single library file. In various embodiments, more than one library file may be utilized. Access to a library file can be provided to a number of mobile devices. The access may be provided as full access or limited access. For example, access to a library file by a mobile device may be limited to a mobile device based on whether the mobile device has one or more media players to operate on the media content. Other criteria may be used to limit access to a mobile device. In various embodiments, the library file is maintained on the system and is accessed from the mobile device remotely. In various embodiments, a library file or a modified version of a library file can be transferred to the mobile device and the mobile device can access the library file locally. The library file can be used by the mobile device to transfer media content from one or more media sources to the mobile device. The mobile device may have wireless capabilities. The mobile device may be a mobile wireless communications device.

Management system 105 and mobile device 110 can interact with each other over any of a number of communication vehicles. For instance, management system 105 and mobile device 110 can be directly connected to each other via a wired-like communication mechanism such as, for example but not limited to, a USB (universal serial bus) cable. Management system 105 and mobile device 110 can be coupled to each other via a local wireless communication mechanism such as, but not limited to, infrared communication, Wi-Fi communication, Bluetooth communication, or other wireless-based communication vehicle. Management system 105 and mobile device 110 can be coupled to each other via a wired network, such as but not limited to, the Internet. Management system 105 and mobile device 110 can be coupled to each other via a wireless network, where one or both of management system 105 and mobile device 110 couple to wireless network via a land-line route. With mobile device 110 being a mobile wireless communications device, such as but not limit to a smart phone, mobile wireless communications device 110 can interact with management system 105 via its wireless subscriber network. Management system 105 and mobile device 110 may each include a number of instrumentalities to select the communication vehicle for the interaction between management system 105 and mobile device 110.

Figure 2:
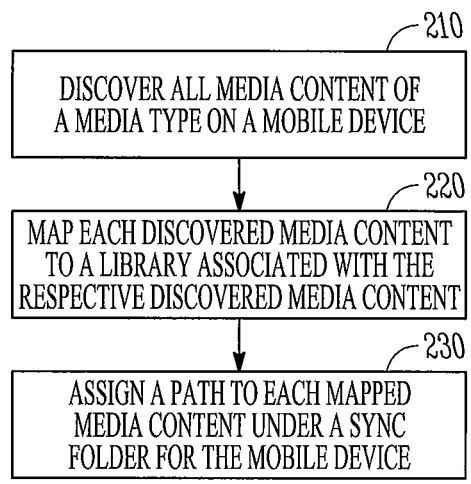
FIG. 2 shows features of an embodiment of a method of managing media content in a mobile device, according to various embodiments.

FIG. 2 shows features of an embodiment of a method of managing media content in a mobile device. These features can be conducted with respect to system 105 and mobile device 110 of FIG. 1. At 210, all media content of a media type on a mobile device is discovered. The discovered media content is media content operable with one or more media players on the mobile device such that the media players are correlated to a media library. The media library for the media players can reside on mobile device 110 with a corresponding media library in or accessible to system 105. The discovery process can operate under the control of a management system of the mobile device, where the management system is separate from the mobile device. For example, from FIG. 1, system 105 can be a management system of mobile device 110. Mobile device 110 may acquire media content from sources other than system 105, such that system 105 can be tasked with performing operations in system 105 to manage in mobile device 110 such acquired media content.

The discovery process can be initiated with a query transmitted from the management system to the mobile device. The query can be a request for data, where the data is the identification of all the media content, by its complete identification, maintained in the mobile device. The complete identification can include a filename, an extension for the filename, and other information. The complete identification may be limited to a filename and an extension for the filename. The mobile device may autonomously respond to the query without user input in response to the query. User input can be generated prior to the request, where the user input sets parameters for the autonomous operation of the mobile device. Alternatively, upon receipt of the request, an application in mobile device may be started that uses user input, in response to the request, to complete the request. The discovery process may be initiated with a query transmitted from the mobile device to the management system requesting that the management system initiate one or more tasks to manage the media content on the mobile device.

At 220, each discovered media content can be mapped to a library associated with the respective discovered media content. The mapping can be directed to an appropriately determined media library on the mobile device. A corresponding library can reside in a storage medium for the management system, which can provide the basis for determining to which media library on the mobile device each discovered media content should be mapped. The storage medium can be a database or a memory system integrated within the management system. The storage medium of the management system can be a database or a memory system on a network accessible by the management system. A database includes an organized group of data to which operations and queries can be applied.

At 230, a path can be assigned to each mapped media content under a sync folder for the mobile device. A sync folder for the mobile device can reside on the mobile device with a corresponding sync folder in the management system. A folder can be viewed as a virtual container within a digital file system that is assigned a storage region in the digital file system and organized for access. A folder contained inside another folder can be also be referred as to as a subfolder. A path can be viewed as a general form, which can include a filename, that specifies a unique location in the digital file system for the file associated with the filename. A path typically identifies a file system location by following a hierarchy expressed in a string of entries generally separated by a delimiting character. A sync folder of management system is a folder whose contents are designated to undergo or have undergone a sync process between the management system and another apparatus, such as a mobile device, whose media content is managed by the management system. The sync folder can include an identification of media files to be transferred to the mobile device. The sync folder can also include an identification of media files that have been transferred to and are currently on the mobile device. Information regarding media files to be transferred to the mobile device can be separate from information regarding media files previously transferred and currently residing on the mobile device. The identification of a media file can be in the form of a path that specifies how to locate the storage of the media file that can be collected and transferred to the mobile device.

Management of the media content of the mobile device can include generating and storing, in the management system, an updated list that contains an identification of each discovered media content that is mapped and assigned a path. This updated list can be transmitted to the mobile device. The updated list may be transmitted as a text file. Alternatively, the updated list can be generated in the mobile device under the control and processing by the management system. The updated list identifies all the media content on the mobile device that is supported by media players in the mobile device correlated to libraries in the management system. When a file of media content is deleted from the mobile device, the identity of this file can be removed from the updated list. Within the user interface of the management system, the updated list can be managed and displayed on a display for the management system as a playlist. Since the updated list is a compilation of all media content of a media type on the mobile device, the updated list may not be a playlist, but may be referred to as a virtual playlist. This updated list allows the management system to efficiently control a sync process with the mobile device by refraining from copying, to the mobile device, media content that is identified on the updated list. The management system can manage different types of media content among a plurality of different mobile devices and different types of mobile devices. For example, the management system can manage a mobile wireless communications device having one or more audio players operable to play songs on the mobile wireless communications device.

Various mobile wireless communications devices can include one or more audio players operable to play songs. This music may be loaded onto the mobile wireless communications device by a management system of the mobile wireless communications device. However, the mobile wireless communications device can also acquire music from sources other than from a sync process with the management system for the mobile wireless communications device. For example, music can be copied onto the mobile wireless communications device using other mechanisms such as downloading music from commercial web sites for ITunes® audio players, Windows Media Player® (WMP), RealPlayer®, and other players. The music may be copied from sources other than the management system via USB connections, file transfer over a wireless communication network, an e-mail transfer, or from a Roxio® application. The management system can also be a source of this same music from these sources or other various sources.

In an embodiment, the management system includes instrumentality to sync music to the mobile wireless communications device without creating duplicates of the songs on the mobile wireless communications device. The sync process can be realized in the form of the transfer of executable files operable by audio players on the mobile wireless communications device. The transfer from the management system to the mobile wireless communications device can be made via USB connections, file transfer over a wireless communication network, an e-mail transfer, or other transfer mechanism. The wireless communication network may be a wide area network (WAN) or a local area network such as a Bluetooth connection, a Wi-Fi network, an infrared connection, or other wireless mechanism. The process on the management system can be conducted using a sync folder for the mobile wireless communications device that efficiently manages the syncing of songs with the mobile wireless communications device without creating duplicates of the songs. The electronic representation of a song that can be operated upon by an audio player may be referred to as a song.

Figure 3:
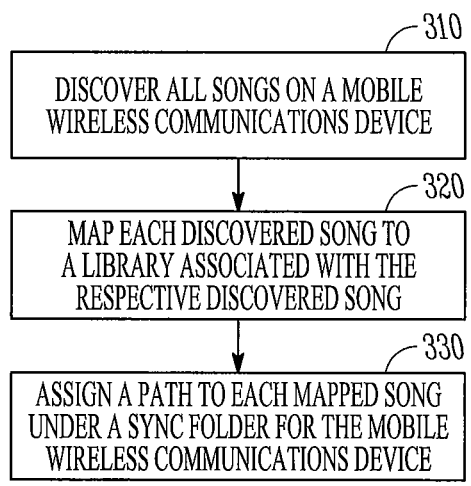
FIG. 3 shows features of an embodiment of a method of managing music in a mobile wireless communications device, according to various embodiments.

FIG. 3 shows features of an embodiment of a method of managing music in a mobile wireless communications device. These features can be conducted with respect to system 105 and mobile device 110 of FIG. 1. These features may be conducted in a manner similar to or identical to the features of managing a mobile device in FIG. 2. At 310, all songs on a mobile device are discovered. The discovered songs are songs operable with one or more media players on the mobile device such that the media players are correlated to a media library associated with the management system and the mobile wireless communications device. The discovery process can operate under the control of a management system of the mobile wireless communications device, where the management system is separate from the mobile wireless communications device. For example, from FIG. 1, system 105 can be a management system of mobile wireless communications device 110. Mobile wireless communications device 110 may acquire songs from sources other than system 105, such that system 105 can be tasked with performing operations in system 105 to manage in mobile wireless communications device 110 such acquired songs.

The discovery process can include discovering all songs on the mobile wireless communications device such that the songs are not identified in the management system as having been synced to the mobile wireless communications device or scheduled to be synced to the mobile wireless communications device. During discovery, the file extension of each song on the mobile wireless communications device can be compared with file extensions operable with one or more audio players on the mobile wireless communications device. Different mobile wireless communications devices may support different song extensions. The discovery process can optionally be limited to those songs on the mobile wireless communications device whose corresponding audio players are identified in the management system as being supported by the mobile wireless communications device. Songs identified as not being supported (or not being identified as being supported) may be ignored or may be listed in a file as songs on the mobile wireless communications device that are not supported. Such scenarios can arise with respect to a mobile wireless communications device that is subjected to management under multiple management systems. The initiation of the discovery process by the management system or by the mobile wireless communications device can be conducted in a manner similar to or identical to the initiation discussed with respect to a mobile device associated with FIG. 2.

At 320, each discovered song can be mapped to a library associated with the respective discovered song. The mapping can be directed to an appropriately determined media library on the mobile wireless communications device. A corresponding library can reside with the management system, which can provide the basis for determining to which music library on the mobile wireless communications device each discovered song should be mapped. The library for the management system can reside in a storage medium of the management system. The storage medium can be a database or a memory system integrated within the management system. The storage medium of the management system can be a database or a memory system on a network accessible by the management system.

For each discovered song, mapping the discovered songs can include comparing the filename of the discovered song with entries in its associated music library, where the associated music library can be identified by the file extensions of the songs. If matched to an entry in the associated music library, the file size of the discovered song can be compared with the file size of the corresponding entry. In addition or alternatively, if matched to an entry in the associated music library, a number of bytes of the discovered song can be compared with bytes from a corresponding stored song correlated to the matched entry. The number of bytes may be less than all the bytes of the discovered song. The comparison may include comparing all or almost all of the bytes of the discovered song with the corresponding stored song. Due to the possibility of relatively large files, the byte comparison may be conducted relative to a threshold such that the number of bytes compared is less than or equal to the threshold.

At 330, a path can be assigned to each mapped song under a sync folder for the mobile wireless communications device. A sync folder for the mobile wireless communications device can reside on the mobile wireless communications device with a corresponding sync folder in the management system. After assigning paths to each mapped song, the files of the mapped songs can be moved into a location correlated to its associated music library. The location can be an appropriate machine readable storage medium on the mobile wireless communications device. A copy of the mapped song can also be moved to a location for the use of the management system. The location for the management system can be in a database or memory system that is accessible by the management system, where the database or memory system may be integrated in the management system or operably coupled to the management system over a network.

Management of the songs residing on the mobile wireless communications device can include generating and storing, in the management system, an updated list that contains an identification of each discovered song that is mapped and assigned a path. This updated list can be transmitted to the mobile wireless communications device. The updated list may be transmitted as a text file. Alternatively, the updated list can be generated in the mobile wireless communications device under the control and processing by the management system. The updated list identifies all the songs on the mobile wireless communications device that are supported by media players in the mobile wireless communications device correlated to libraries in the management system. When a file of a song is deleted from the mobile wireless communications device, the identity of this file can be removed from the updated list. Within the user interface of the management system, the updated list can be managed and displayed on a display for the management system as a playlist. Since the updated list is a compilation of all songs on the mobile wireless communications device, the updated list may not be a playlist, but may be referred to as a virtual playlist. This updated list allows the management system to efficiently control a sync process with the mobile wireless communications device by refraining from copying, to the mobile wireless communications device, songs that are identified on the updated list. The various features discussed with respect to music can be applied to other media types.

Figure 4:
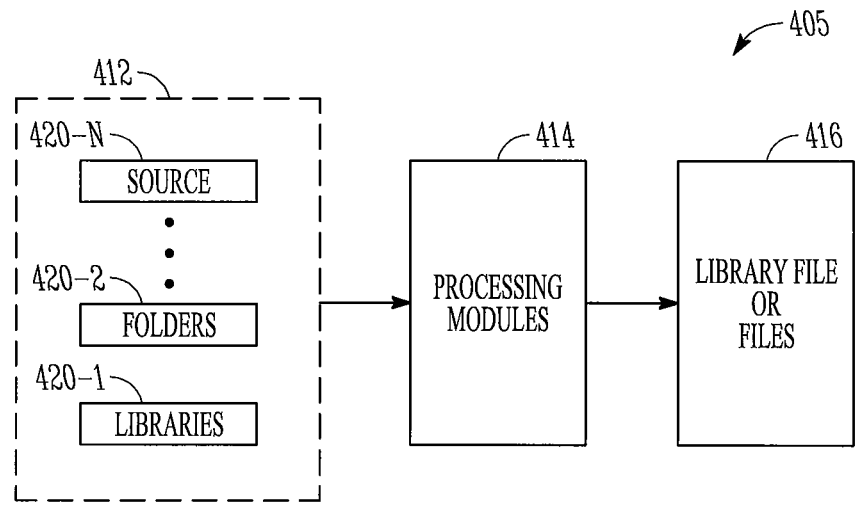
FIG. 4 is a functional block diagram of an example embodiment of a system for managing media content, according to various embodiments.

FIG. 4 is a functional block diagram of an example embodiment of a system 405 for managing media content. All or portions of system 405 may be operated in a manner similar or identical to the apparatus and methods discussed in relation to FIGS. 1-3. System 405 includes inputs 412, processing modules 414, and outputs 416. Inputs 412 include one or more media sources 420 of media content (also herein referred to as "media sources," "media source," "sources," or "source"). Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, and wmf.

Media sources 412 may include media libraries 420-1 for media players such as, but not limited to, libraries for ITunes® audio players, Windows Media Player® (WMP), RealPlayer®, and other players. Each library may include collections of various media content. A collection is a subset of the files in a library. The collections may include references to the files. Each collection may refer to anywhere from zero files to all of the files in the library. An example of a collection of a music library is a playlist. In various embodiments, sources 412 of media content may be files within one or more folders 420-2 on a single computer system or on multiple computer systems.

Processing modules 414 include software and/or hardware that can transfer media content from media sources to devices that use the associated media. Processing modules include instrumentality to operate as a "connector," which means that the processing modules interface with media sources to collect information associated with a media file configured to operate with a specific media player. Processing modules may be arranged with a set of connectors, one for each type of media player incorporated in system 405 or used by mobile devices whose media content is managed by system 405. Processing modules 414 may include connectors to interact with mobile wireless communications devices, where the mobile wireless communications devices can also be a source of media content. Processing modules 414 may use, but are not limited to, a Windows COM interface or a XML file when connecting to various media sources. In addition, processing modules 414 may create a representation (for example, a library or libraries of information regarding the media content) of the media content available from multiple media sources. In various embodiments, media content may include information with respect to another media file that is played by a media player. For instance, a jpeg (Joint Photographic Experts Group) file may be a file of album art for songs on an album, where the media files of the songs are played on a media player.

In various embodiments, output 416 from processing modules 414 is a representation created by processing modules 414. The representation may also be maintained by processing modules 414. Output 416 may include device specific data for a mobile wireless communications device, a media player, or other destination device. Output 416 may comprise metadata, such as metadata based on user preferences or device settings. Generally, metadata is information about data. Various media content may be metadata with respect to other media content. For example, a file having a jpg file format may provide information regarding an audio file having a mp3 file format such that the jpg file is metadata for the mp3 file.

In an example embodiment, the representation may be any mechanism for identifying the content of the media source files. In some embodiments, a library file 416 created by processing modules 414 contains metadata for the media content available in the one or more media sources 420-1 . . . 420-N, but omits the actual media content. Library file 416 may be organized using a standard format that represents the information contained in the media sources. In various embodiments, the standard format is a compressed format and/or a format that is substantially smaller than the media library itself. For example, a media library with 30 GB of audio files may be presented by processing modules 414 in a file that may be 200 KB.

In operation, system 405 for managing media content shown in FIG. 4 creates a representation of the media content available in one or more media sources 420-1 . . . 420-N and provides a means for accessing the media content by any destination device with a media player including a mobile wireless communications device. The destination device may browse the representation and may select individual media content items to copy or transfer from the media source to the destination device. After selection, all or a portion of the media content item maybe transferred to the destination device and may be played on a media player on the destination device. In various embodiments, system 405 brings content from multiple media sources into a single unified library 416 and pushes out device specific metadata from the single library to the specific destination device.

Figure 5:
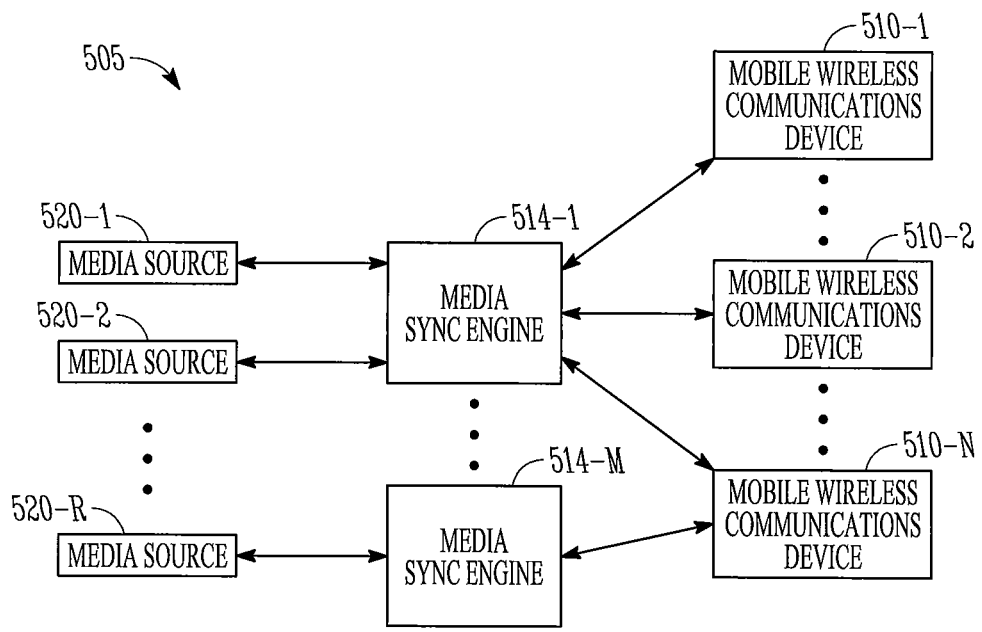
FIG. 5 is a block diagram of an architecture for transferring media content between media synchronization engines of a system and mobile wireless communications devices, according to various embodiments.

FIG. 5 is a block diagram of an architecture for transferring media content between media synchronization engines 514-1 . . . 514-M of a system 505 and mobile wireless communications devices 510-1 . . . 510-N. All or portions of system 505 may be operated in a manner similar or identical to the apparatus and methods discussed in relation to FIGS. 1-4. The media content can be provided from media sources 520-1 . . . 520-R. Media sources 520-1 . . . 520-R can reside on system 505. The media content in media sources 520-1 . . . 520-R may be provided from various sources external to system 505. For instance, media sources 520-1 . . . 520-R can be media libraries resident on system 505 that are created as libraries to store media files provided by media stores accessed on the Internet. Media sources 520-1 . . . 520-R may contain media files loaded in the system by a user from a portable storage medium such as, but not limited to, a portable magnetic memory, a memory stick, a CD, a DVD, or other machine readable storage medium. Mobile wireless communications devices 510-1 . . . 510-N may also be media sources. Media synchronization engines 514-1 . . . 514-M (also referred to as media sync engines or media sync applications) that operate in the transferal of a media file may also operate to manage a media library and a metadata library file associated with the media file. The media file can be operated on by a media player to provide the media content for visual and/or audio presentation to a user of system 505 or one or more of mobile wireless communications devices 510-1 . . . 510-N.

Media sync engines 514-1 . . . 514-M can create representations (such as a library file or files) identifying media content available from multiple media sources and provide data from the library to mobile wireless communications devices 510-1 . . . 510-N. In an embodiment, a media sync engine is an example of a processing module shown in FIG. 4. In various embodiments, a media sync engine provides a method to synchronize a media library, such as an ITunes® digital music library, a Windows Media Player® digital music library, or other commercial based library, with a smart phone. The files may be transferred using a wireless connection, such as a wireless wide area network, a wireless local area network such as a Wi-Fi network, a personal wireless connection such as a wireless USB connection. The files may be transferred using a wired connection such as a high speed USB connection.

Mobile wireless communications devices 510 may include, but are not limited to, mobile telephones, portable computers, personal digital assistants (PDAs), media players and other devices that may be conveniently carried by a user and provide wireless communication. Mobile telephones include wireless communications devices that have generally been referred to as cell phones. Mobile telephones may include a wide range of communication devices from portable phones with limited functionality beyond voice communication to portable phones capable of providing the functionality of a personal computer. Multiple devices of different types/capabilities may transfer media content using one or more media sync engines.

Figure 6:
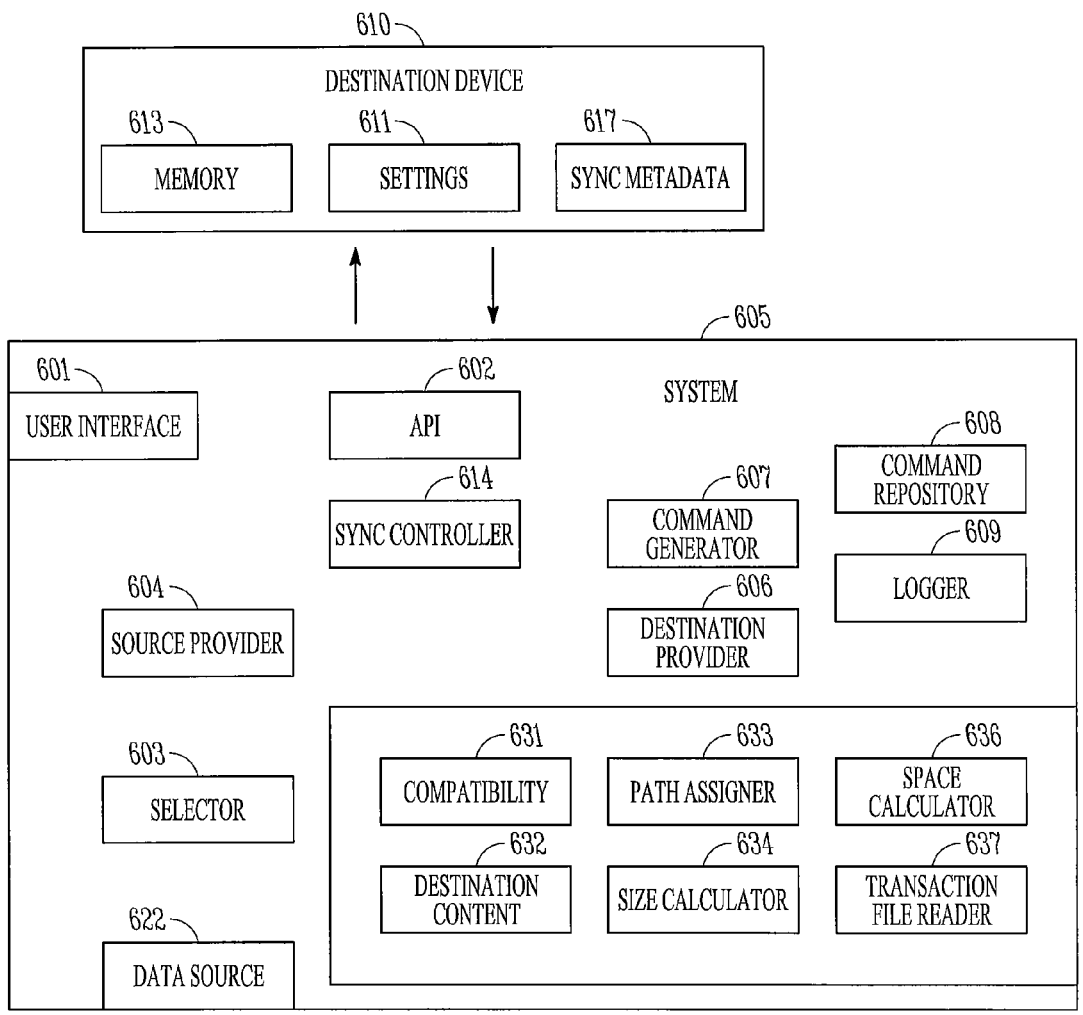
FIG. 6 illustrates a block diagram of an example system that can synchronize media files with a destination device, according to various embodiments.

FIG. 6 illustrates a block diagram of a non-limiting example system 605 that can synchronize media files with a destination device 610. System 605 can include the functionality of the processing modules 414 shown in FIG. 4 and the functionality of media sync engines 514-i of FIG. 5, according to an example embodiment. All or portions of system 605 may be operated in a manner similar or identical to the apparatus and methods discussed in relation to FIGS. 1-5. System 605 can include a user interface (UI or GUI for graphic user interface) 601, an application programming interface (API) 602, a selector 603, a source provider 604, a sync controller 614, a destination provider 606, and a command generator 607. System 605 may reside on a PC that interacts with one or more mobile devices, such as mobile wireless communications devices, that are destination devices for media file sync.

System 605 can provide destination device 610 with media files from data source 622. Data source 622 can include a library, which may be arranged as a multimedia library, a music library, a video library, an e-book library, a documents library, or combinations thereof. Though data source 622 is shown as a single entity, it can be configured as multiple data sources. The multiple data sources of data source 622 can operate under different protocols using different data formats. Data source 622 can be configured similar to or identical to sources 420-1, 420-2 . . . 420-N of FIG. 4 and/or media sources 520-1, 520-2 . . . 520-R of FIG. 5. Data source 622 can be configured as a data source within system 605, such as a memory system or a database. Data source 622 can be configured external to but accessible by system 605.

API 602, selector 603, source provider 604, sync controller 614, destination provider 606, and command generator 607 can operate to perform multiple tasks, including, but not limited to, functioning as a sync module that includes instrumentality to conduct synchronization operations with one or more destination devices 610. Sync operations can include adding media files to and removing media files from one or more destination devices 610. System 605 can interact with destination device 610 to determine its identity, to acquire information on the availability of allocated media storage on the mobile device, and to acquire information on all media files residing on the mobile device.

Destination device 610 includes settings 611, memory 613, and sync metadata 617, which components can provide and/or store information corresponding to a sync operation with system 605. Sync metadata 617 can include metadata associated with media content stored and operated on by a media player on destination device 610. Settings 611 can include such information as a personal identification number (PIN). Other information stored in settings 611 can include, but is not limited to, identification of the OS of destination device 610, a user chosen name for destination device 610, and an identification of the version of media sync that destination device 610 is using with respect to system 605.

System 605 includes user interface 601 configured as a mechanism for a user of system 605 to interact with system 605 including providing input for a sync operation with destination device 610. A user of system 605 can receive information regarding the settings of destination device 610 via user interface 601 along with information regarding media content accessible to the user via processes of system 605 or via destination device 610. However, sync controller 614 can manage operation of a sync session such that user related operations are conducted in a background process separate from the user interface. Background operations can be conducted without user interaction, but may use user-related information that is stored in system 605 or stored in a database accessible by system 605.

Selector 603 can include a set of connectors, one or more for each type of media player incorporated in system 605 or in destination devices 610. Selector 603, using appropriate connectors, can identify specific instances of a particular type of library in data source 622. Selector 603 can use its connectors to perform a discovery function that finds individual libraries. A connector for a particular library is capable of communicating with the particular library or a file in the library using a corresponding application programming interface, protocols, file formats, etc. When an individual library is discovered, the connector can retrieve media collections from that instance of the individual library. The connectors of selector 603 may include an iTunes connector, a WMP connector, a RealPlayer connector, an autofill connector, a connector for a specific source of e-books, and various other connectors correlated to instrumentality for operating on the respective media files to provide a presentation to the user of system 605. An individual connector may be configured as a combination of a read only connector and a writeable connector. A writeable connector may perform such activities as adding a user-assigned rating for a song, creating a playlist, editing a playlist, deleting a song, etc. An autofill connector, for example, can be realized as a combination of connectors to perform discovery functions across different libraries during an autofill operation of system 605 for a specific destination device 610.

Selector 603 provides a group mechanism, in that, it functions to maintain account of selections made from data source 622. For example, if music item is chosen, selector 600 maintains the ID of the chosen music item including such information as the number of music tracks in the chosen music item. Selector 603 can be arranged to group various pieces of information data regarding chosen media files.

Source provider 604 determines the type of media data included in a sync session, where it functions as a finder, providing a discovery mechanism for connectors. Functioning as a finder, source provider 604 can identify what connectors of selector 603 are available for processing. The available connectors may register with source provider 604. If a separate connector is used for each type of library, the particular connectors that are discovered by source provider 604 can determine what type of libraries are in system 605. Source provider 604 can be arranged as an aggregation of components (one or many instances) for providing discovery mechanisms.

Destination provider 606 is similar to source provider 604 except that destination provider operates with respect to the types of media data on a particular destination device 610 with which system 605 enters into a sync session. Destination provider 606 can find connectors to interact with one or more destination devices 610, where destination devices 610 can also be sources of media content. Content from destination device 610 can be read into a database of system 605 with the content represented from destination provider 606 correlated to destination device 610.

Destination provider 606 can operate using a set of modules including compatibility 631, destination content 632, path assigner 633, size calculator 634, space calculator 636, and transaction file reader 637. Compatibility 631 can operate to provide information and/or conduct actions to reconcile compatibility such as with different versions of hardware and/or software on designation device 610. Path assigner 633 can operate as a component that calculates unique destination path of a to-be-copied media taking name collisions, associated with different media files, and operating system (OS) path limits into consideration. Size calculator 634 can operate as a component that calculates a future size of a media on a specified destination device 610 where it will be copied. Size calculator 634 can take into account compression (e.g. scaling of images), disk differences (as in physical cluster size of disk) and aids in projecting these estimates on a progress bar displayer by UI 601. Space calculator 636 can operate as to provide input as to an amount of space available for syncing. Transaction file reader 637 can operate to provide a transaction file of what was transacted as part of sync to a specific destination device 610 in a previous sync operation. Transaction file reader 637 can be used to determine a delta to be copied as part of next sync operation to the specific destination device 610. Destination content 632 can operate to provide an identification of what media content already resides on destination device 610 as part of the last sync with the specified destination device 610.

Sync controller 614 provides a path assignment function. It essentially maps the media item from data source 622 to destination device 610. Once the mapping is complete, the appropriate commands and command format is formed by command generator 607 to conduct the sync session with destination device 610.

Command generator 607 can be configured to operate in conjunction with a command repository 608 and a logger 609. Command repository 608 can operate as a repository of commands holding commands to be executed at various stages during a sync operation. Command repository 608 can be configured as an aggregation of components (one or many instances) to hold various commands and/or sets of commands. For example, command repository 608 can include a set of commands for a cleanup stage that implements the deletion of non-essential and temporary files. In another example, command repository 608 can include a set of commands for a copy stage that implements the copying of data and metadata (e.g. album artwork). Logger 609 can operate as a component that logs sync activities and usage statistics, for example, for diagnostics purposes and beta statistics.

API 602 can include instrumentality for managing functions from selection to command generation for a sync session, such that it can provide overall management of a sync session between system 605 and destination device 610. API 602 can provide a unified interface to multiple sources/libraries of data source 622. Under direction of API 602, media collected for a sync session can be collected in a sync set.

The components of system 605 shown in FIG. 6 as independent entities can be implemented in an integrated format. The various components of system 605 can be realized as software, hardware, and combinations of software and hardware. The software is implemented as instructions stored in a machine-readable storage medium that can be executed by one or more processors of system 605. Other systems having architectures that differ from system 605 can be implemented in an arrangement with a mobile device as in FIG. 1 to conduct management of media files in the mobile device in a manner similar or identical to the manner of operation associated with FIGS. 2 and 3.

Embodiments, as illustrated in FIGS. 1-6, and similar embodiments may be implemented as a desktop application to transfer media content from multiple sources to a mobile device, such as a mobile wireless communications device, or other destination device. The desktop application for managing media content may be launched on a PC. The desktop application may be automatically launched on startup of the PC. The desktop application may be launched on detection of a device connection to the PC. In various embodiments, a user may launch the desktop application. Alternatively, embodiments, as illustrated in FIGS. 1-6, and similar embodiments may be implemented to allow a mobile device, such as a mobile wireless communications device, or other destination device to update content already present on the mobile device with media content from multiple sources through a management system.

In various embodiments, transfer/sync of multimedia files, audio files, video files, and/or combinations thereof between a management system (and associated media managers of the management system) and a mobile device, such as a mobile wireless communications device, may be accomplished using a number of mechanisms. The transfer/sync between the mobile device and the management system may be accomplished through a wired USB connection or a wireless USB connection. The transfer/sync between the mobile device and the management system may be accomplished through a Wi-FI communication session. The transfer/sync between the mobile device and the management system may be accomplished over wide area network (WAN) such as a wireless network. Other communication vehicles may be used.

Figure 7:
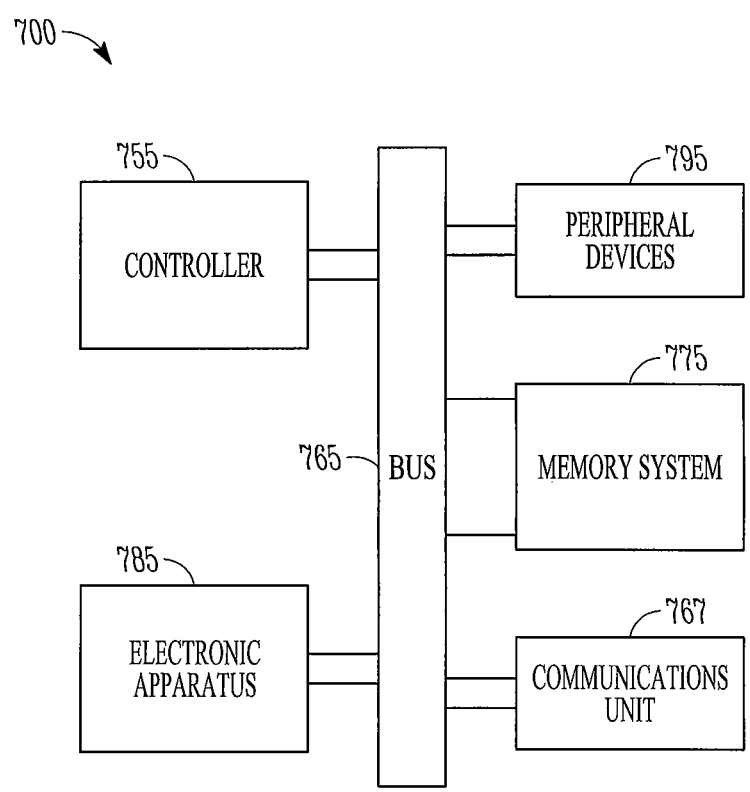
FIG. 7 depicts a block diagram of an embodiment of a system having a controller and a memory system, according to various embodiments.

FIG. 7 depicts a diagram of an embodiment of a general architecture of a system 700 having a controller 755 and a memory system 775 that can be used in a management system and/or in a mobile device, where media files on the mobile device are managed by the management system that is a separate entity from the mobile device. System 700 can also include electronic apparatus 785 and a bus 765, where bus 765 provides electrical conductivity among the components of system 700. In an embodiment, bus 765 includes an address bus, a data bus, and a control bus, each independently configured. In an alternative embodiment, bus 765 uses common conductive lines for providing one or more of address, data, or control, the use of which is regulated by controller 755. Bus 765 may be realized as multiple busses. Further, peripheral device or devices 795 can be coupled to bus 765. Peripheral devices 795 can include one or more displays, additional storage memory system, and/or other control devices that may operate in conjunction with controller 755 and/or memory system 775. In an embodiment, controller 755 is realized as one or more processors.

In an embodiment, system 700 can be arranged as a management system such that controller 755 and memory system 775 can be arranged to manage media content and associated information on system 700 and on mobile devices managed by management system 700. Electronic apparatus 785 can include additional components to operate as a management system and/or to operate as one or more types of media players. Communications unit 767 can include one or more communications interfaces to operate over a wired network and/or a wireless network. Example interfaces can include a Wi-Fi interface, a USB interface, an Ethernet interface, an infrared interface, a Bluetooth interface, an interface to operate with a wireless service provider, and other appropriate interfaces. In an embodiment, system 700 can be realized as a PC. The PC may include instrumentality distributed throughout the PC to operate as a wireless server. System 700 arranged as a PC can operate according to any of the various embodiments discussed herein to manage media content and associated information within the PC and in conjunction with one or more mobile devices, such as mobile wireless communications devices.

Various embodiments or combination of embodiments for apparatus and methods for a management system 700, such as a PC, to manage media content on a mobile device, as described herein, can be realized in hardware implementations, software implementations, and combinations of hardware and software implementations. These implementations may include a machine-readable medium having machine-executable instructions, such as a computer-readable medium having computer-executable instructions, for operating the system in a relationship with one or more mobile devices such that media content and associated information is managed between the system and the mobile device. The communications of the system with a mobile wireless communications device can be conducted on a secured basis. The machine-readable medium is not limited to any one type of medium. Machine-readable storage media may include, but are not limited to, solid-state memories, optical media, and magnetic media. Non-limiting examples of machine-readable storage media include, but are limited to, hard disks, removable magnetic disks, removable optical disks (e.g., compact disks and digital video disks), magnetic cassettes, memory cards, memory sticks, Random Access Memories (RAMs), Read Only Memories (ROMs), and other storage media.

In various embodiments for system 700 arranged as a management system, memory system 775 includes a machine-readable storage medium that stores instructions, which when performed by system 700, cause system 700 to perform operations comprising: discovering, on a mobile device, all media content of a media type; mapping each discovered media content to a library associated with the respective discovered media content; and assigning a path to each mapped media content under a sync folder of the management system. Each discovered media content is operable with one or more media players on the mobile device such that the media players are correlated to a media library. Each media library may be part of a library residing on the mobile device. For each media library, there can be a corresponding media library that may be part of a library residing in a storage medium, such as memory system 775, for management system 700. The discovery is under the control of system 700 for the mobile device, where the management system 700 is separate from the mobile device.

The machine-readable storage medium may include instructions, which when performed by system 700, cause system 700 to perform operations including: generating and storing an updated list that contains an identification of each discovered media content that is mapped and assigned a path; and refraining from copying, to the mobile device, media content that is identified on the updated list. The instructions can generating the updated list in management system 700 and transmitting the updated list to the corresponding mobile device, such as a corresponding mobile wireless communications device. The instructions may include instructions to operate with a mobile wireless communications device having one or more media players operable on the mobile wireless communications device. The instructions may include discovering all songs, as the media files, operable with the one or more media players as audio players. Discovering all songs on the mobile wireless communications device can include discovering all songs on the mobile wireless communications device such that the songs are not identified in the management system as having been synced to the mobile wireless communications device or scheduled to be synced to the mobile wireless communications device. Instructions to discover all songs on the mobile wireless communications device can include instructions to compare song extensions with extensions operable with one or more audio players on the mobile wireless communications device. Instructions to map the discovered songs can include instructions to map each song to its associated music library, where each associated music library can be correlated to a respective audio player on the mobile wireless communications device. The instructions can include instructions, which when performed by management system 700, cause management system 700 to perform operations including: after assigning paths to each mapped song, moving a file of each mapped song into a location correlated to an associated music library to which the respective mapped song is matched; generating and storing an updated list that contains an identification of each discovered song that is mapped and assigned; and refraining from copying, to the mobile wireless communications device, a song that is identified on the updated list.

In an embodiment, system 700 can be arranged as a mobile device such that controller 755 and memory system 775 can be arranged to manage media content in conjunction with a management system that controls system 700 arranged as a mobile device. The mobile device can be a mobile wireless communications device. Electronic apparatus 785 can include components to operate as a mobile wireless communications device and to operate as one or more types of media players. Communications unit 767 can include one or more communications interfaces to operate system 700 as a mobile wireless communications device over a wired network and/or a wireless network. Example interfaces can include a Wi-Fi interface, a USB interface, a Bluetooth interface, an interface to operate with a wireless service provider, and other appropriate interfaces. System 700, arranged as a mobile device such as a mobile wireless communications device, can operate according to any of the various embodiments discussed herein to manage media content and associated information within the mobile device in conjunction with a management system having software and/or hardware to manage the media content.

Various embodiments or combination of embodiments for apparatus and methods for a mobile device, such as a mobile wireless communications device, as described herein, can be realized in hardware implementations, software implementations, and combinations of hardware and software implementations. These implementations may include a machine-readable medium having machine-executable instructions, such as a computer-readable medium having computer-executable instructions, for operating the mobile device to manage its media content and associated information within the mobile device, in conjunction with a management system, such as a PC. The communications between a mobile wireless communications device and the system can be conducted on a secured basis. The machine-readable medium is not limited to any one type of medium. Machine-readable storage media may include, but are not limited to, solid-state memories, optical media, and magnetic media. Non-limiting examples of machine-readable storage media include, but are limited to, hard disks, removable magnetic disks, removable optical disks (e.g., compact disks and digital video disks), magnetic cassettes, memory cards, memory sticks, Random Access Memories (RAMs), Read Only Memories (ROMs), and other storage media.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    discovering, on a mobile device, all media content of a media type that are operable with two or more media players on the mobile device such that each media player is correlated to a respective media library on the mobile device, the discovery on the mobile device being under the control of a management system of the mobile device, the management system being separate from the mobile device;
    mapping, under the control of the management system, each discovered media content on the mobile device to the media library associated with the respective discovered media content; and
    assigning a path to each mapped media content under a sync folder of the mobile device.

2. The method of claim 1, wherein the method includes generating and storing an updated list that contains an identification of each discovered media content that is mapped and assigned a path.

3. The method of claim 2, wherein the method includes refraining from copying, to the mobile device, media content that is identified on the updated list.

4. The method of claim 1, wherein the mobile device is a mobile wireless communications device having two or more media players operable on the mobile wireless communications device.

5. The method of claim 4, wherein discovering all media content of a media type includes discovering all songs operable with the two or more media players as audio players.

6. The method of claim 5, wherein discovering all songs on the mobile wireless communications device includes discovering all songs on the mobile wireless communications device such that the songs are not identified in the management system as having been synced to the mobile wireless communications device or scheduled to be synced to the mobile wireless communications device.

7. The method of claim 5, wherein discovering all songs on the mobile wireless communications device includes comparing song extensions with extensions operable with one or more audio players on the mobile wireless communications device.

8. The method of claim 5, wherein mapping the discovered songs includes mapping each song to its associated music library, each associated music library correlated to a respective audio player on the mobile wireless communications device.

9. The method of claim 8, wherein mapping the discovered songs includes for each discovered song:
- comparing the filename of the discovered song with entries in its associated music library; and
- upon matching an entry in the associated music library, comparing the file size of the discovered song with the file size of the corresponding entry.

10. The method of claim 8, wherein mapping includes for each discovered song:
- comparing the filename of the discovered song with entries in its associated music library; and
- upon matching an entry in the associated music library, comparing a number of bytes of the discovered song with bytes from a corresponding stored song correlated to the matched entry.

11. The method of claim 10, wherein the number of bytes is less than all the bytes of the discovered song.

12. The method of claim 5, wherein after assigning paths to each mapped song, each file of the mapped songs are moved into a location correlated to its associated music library for the mobile wireless communications device.

13. The method of claim 5, wherein the method includes generating and storing an updated list that contains an identification of each discovered song, mapped and assigned.

14. The method of claim 13, wherein the method includes refraining from copying, to the mobile wireless communications device, a song that is identified on the updated list.

15. A machine-readable storage system that stores instructions, which when performed by a machine, cause the machine to perform operations comprising:
- discovering, on a mobile device, all media content of a media type that are operable with two or more media players on the mobile device such that each media player is correlated to a respective media library on the mobile device, the discovery on the mobile device being under the control of a management system of the mobile device, the management system being separate from the mobile device;
- mapping, under the control of the management system, each discovered media content on the mobile device to the media library associated with the respective discovered media content; and
- assigning a path to each mapped media content under a sync folder of the mobile device.

16. The machine-readable storage system of claim 15, wherein the instructions includes instructions, which when performed by the machine, cause the machine to perform operations including:
- generating and storing an updated list that contains an identification of each discovered media content that is mapped and assigned a path; and
- refraining from copying, to the mobile device, media content that is identified on the updated list.

17. The machine-readable storage system of claim 15, wherein the mobile device is a mobile wireless communications device having two or more media players operable on the mobile wireless communications device.

18. The machine-readable storage system of claim 17, wherein discovering all media content of a media type includes discovering all songs operable with the two or more media players as audio players.

19. The machine-readable storage system of claim 18, wherein discovering all songs on the mobile wireless communications device includes discovering all songs on the mobile wireless communications device such that the songs are not identified in the management system as having been synced to the mobile wireless communications device or scheduled to be synced to the mobile wireless communications device.

20. The machine-readable storage system of claim 18, wherein discovering all songs on the mobile wireless communications device includes comparing song extensions with extensions operable with one or more audio players on the mobile wireless communications device; and mapping the discovered songs includes mapping each song to its associated music library, each associated music library correlated to a respective audio player on the mobile wireless communications device.

21. The machine-readable storage system of claim 18, wherein the instructions include instructions, which when performed by the machine, cause the machine to perform operations including:
- after assigning paths to each mapped song, moving a file of each mapped song into a location correlated to an associated music library to which the respective mapped song is matched;
- generating and storing an updated list that contains an identification of each discovered song that is mapped and assigned;
- refraining from copying, to the mobile wireless communications device, a song that is identified on the updated list.

22. A system comprising:
a processor;
a machine-readable storage system that stores instructions, the machine-readable storage system operably coupled to the processor such that the instructions, when executed by the processor, cause the system to perform operations comprising:
- discovering, on a mobile device, all media content of a media type that are operable with two or more media players on the mobile device such that each media player is correlated to a respective media library on the mobile device, the discovery on the mobile device being under the control of the system, the system being separate from the mobile device;

mapping, under the control of the system, each discovered media content on the mobile device to the media library associated with the respective media content;

assigning a path to each mapped media content under a sync folder of the mobile device.

23. The system of claim 22, wherein the instructions includes instructions, which when performed by the machine, cause the system to perform operations including:

generating and storing an updated list that contains an identification of each discovered media content that is mapped and assigned a path; and refraining from copying, to the mobile device, media content that is identified on the updated list.

24. The system of claim 22, wherein the mobile device is a mobile wireless communications device having two or more media players operable on the mobile wireless communications device.

25. The system of claim 24, wherein discovering all media content of a media type includes discovering all songs operable with the two or more media players as audio players; and mapping each discovered song to its associated music library, each associated music library correlated to a respective audio player on the mobile wireless communications device; and the instructions include instructions, which when performed by the machine, cause the system to perform operations including:

after assigning paths to each mapped song, moving a file of each mapped song into a location correlated to an associated music library to which the respective mapped song is matched;

generating and storing an updated list that contains an identification of each discovered song; and refraining from copying, to the mobile wireless communications device, a song that is identified on the updated list in the system.

* * * * *